United States Patent
Remboski et al.

(10) Patent No.: US 10,877,060 B2
(45) Date of Patent: Dec. 29, 2020

(54) OMNI-DIRECTIONAL ANEMOMETER

(71) Applicants: Donald James Remboski, Ann Arbor, MI (US); Jacqueline A. Dedo, Wolverine Lake, MI (US); Assi Biton, Rosh-Haayin (IL); Dani Shafriri, Rosh-Haayin (IL); Arik Greenberger, Rosh-Haayin (IL)

(72) Inventors: Donald James Remboski, Ann Arbor, MI (US); Jacqueline A. Dedo, Wolverine Lake, MI (US); Assi Biton, Rosh-Haayin (IL); Dani Shafriri, Rosh-Haayin (IL); Arik Greenberger, Rosh-Haayin (IL)

(73) Assignee: Traffilog, Rosh-Haayinn (IL)

( * ) Notice: Subject to any disclaimer, the term of this patent is extended or adjusted under 35 U.S.C. 154(b) by 281 days.

(21) Appl. No.: 15/880,629

(22) Filed: Jan. 26, 2018

(65) Prior Publication Data
US 2018/0284148 A1    Oct. 4, 2018

Related U.S. Application Data

(60) Provisional application No. 62/450,592, filed on Jan. 26, 2017.

(51) Int. Cl.
*G01P 5/02*      (2006.01)
*G01P 1/02*      (2006.01)
(Continued)

(52) U.S. Cl.
CPC ............... *G01P 5/02* (2013.01); *B66F 17/006* (2013.01); *G01L 19/0636* (2013.01);
(Continued)

(58) Field of Classification Search
CPC .. G01P 5/02; G01P 13/045; G01P 5/14; G01P 1/122; G01P 13/025; G01P 1/06;
(Continued)

(56) References Cited

U.S. PATENT DOCUMENTS

| 4,645,517 | A | * | 2/1987 | Hagen | B01D 53/26 55/428 |
| 5,267,836 | A | * | 12/1993 | Culp | F04B 19/24 417/202 |

(Continued)

FOREIGN PATENT DOCUMENTS

KR          100932007 B1  *  12/2009

OTHER PUBLICATIONS

Translation of KR-100932007-B1 (Year: 2009).*

*Primary Examiner* — Nathaniel T Woodward
(74) *Attorney, Agent, or Firm* — Reches Patent

(57) ABSTRACT

An omni-directional anemometer may include a housing, a cavity, and a plurality of ports in fluid communication with the atmosphere. The ports may include at least one sensor configured to measure air pressure. The robust housing may be formed by additive manufacturing, casting, machining, or molding. The anemometer may include a controller configured to determine wind speed and direction using the air pressure measurement signals from the at least one sensor. The anemometer may include a communication module configured to send and/or receive signals from the at least one sensor and the controller using wired and/or wireless communication. The communication module may send or receive signals to or from a network, a server, a vehicle, a structure, and/or a user interface. The anemometer may include a power supply connected to the at least one sensor, controller and/or communication module.

21 Claims, 6 Drawing Sheets

(51) Int. Cl.
    *G01P 1/00*     (2006.01)
    *G01P 13/02*     (2006.01)
    *G01L 19/08*     (2006.01)
    *G01L 19/14*     (2006.01)
    *G01L 19/06*     (2006.01)
    *G01P 1/12*     (2006.01)
    *G01P 5/14*     (2006.01)
    *G01P 13/04*     (2006.01)
    *B66F 17/00*     (2006.01)
    *G05D 1/02*     (2020.01)
    *G01L 19/00*     (2006.01)

(52) U.S. Cl.
CPC ........ G01L 19/0654 (2013.01); G01L 19/086 (2013.01); G01L 19/147 (2013.01); G01P 1/026 (2013.01); G01P 1/06 (2013.01); G01P 1/122 (2013.01); G01P 5/14 (2013.01); G01P 13/025 (2013.01); G01P 13/045 (2013.01); G05D 1/0214 (2013.01); *G01L 2019/0053* (2013.01); *G05D 2201/0202* (2013.01)

(58) Field of Classification Search
CPC .. G01P 1/026; G01L 19/0636; G01L 19/0654; G01L 19/147; G01L 19/086; G01L 2019/0053; G05D 1/0214; G05D 2201/0202; B66F 17/006
USPC ..................................................... 73/170.08
See application file for complete search history.

(56) References Cited

U.S. PATENT DOCUMENTS

| | | | | |
|---|---|---|---|---|
| 5,639,964 | A * | 6/1997 | Djorup | G01P 5/00 |
| | | | | 73/170.12 |
| 6,152,102 | A * | 11/2000 | Ruman | F02B 17/00 |
| | | | | 123/295 |
| 6,928,884 | B1 * | 8/2005 | Pearson | G01F 1/46 |
| | | | | 73/861.42 |
| 7,093,483 | B2 * | 8/2006 | Corey | G01P 5/14 |
| | | | | 73/170.14 |
| 7,971,478 | B2 * | 7/2011 | Harrison | G01P 13/02 |
| | | | | 73/170.12 |
| 8,521,449 | B2 * | 8/2013 | Hamann | G01F 1/6842 |
| | | | | 702/45 |

* cited by examiner

OMNI-DIRECTIONAL ANEMOMETER

CROSS REFERENCE TO RELATED APPLICATIONS

Utility Patent Application claims the benefit of U.S. Provisional Patent Application Ser. No. 62/450,592 filed Jan. 26, 2017 entitled "SYSTEM, COMPUTER PROGRAM PRODUCT AND METHOD FOR MEASUREMENTS" which is hereby incorporated by reference in its entirety.

BACKGROUND OF THE INVENTION

1. Field of the Invention

A system and method for an omni-directional anemometer for the measurement of wind speed and direction is provided.

2. Description of the Prior Art

Wind speed and direction is typically measured using a hand-held rotational anemometer with limited accessibility to elevated and/or hazardous locations or a traditional remote rotational anemometer that is vulnerable to incidental contact with other structures or obstacles (i.e., falling debris) or harsh conditions (e.g., vibration).

A goal of construction workers, equipment operators, and others concerned with wind speed and direction is to improve the ability to measure wind speed and direction, particularly at difficult to access locations. Hand-held anemometers typically require an individual to operate, and are limited by the abilities and situation of the individual to measure wind speed and direction. In other words, the individual may not be physically able to access a location where it is critical to know the wind speed and/or direction (i.e., at the top of a crane or tall building). Traditional anemometers, such as the rotating cup type, are vulnerable to the harsh environment of a construction or a building site (e.g., loose material striking the anemometer, vibrations, and overall rough treatment commonly associated with heavy equipment use).

It is a goal of the present disclosure to provide an improved anemometer with the reliability and useful life to be used on heavy equipment such as cranes, excavators, forklifts, articulating booms, teleboom handlers and reach stackers. The improved anemometer provides omni-directional measurement of wind speed and direction without the vulnerable and exposed rotating parts of typical anemometers. It is another goal of the present disclosure to improve the accuracy of wind speed and direction measurement by using a plurality of air pressure sensors and computer resources to calculate the highest wind speed and its direction. It is another goal of the present disclosure to accurately communicate the measured highest wind speed and its direction to interested individuals (e.g., equipment operators, construction managers, building superintendents), so that appropriate decisions can be made based on the wind speed and direction.

The current solution provides a robust anemometer that measures wind speed and direction by measuring the wind from multiple measuring points using internally mounted air pressure sensors in a rugged housing or enclosure. The current solution measures air pressure at the multiple measuring points and that information is used to determine the highest wind speed and its direction. The current solution also provides the highest wind speed and its direction to interested individuals. A need exists for a robust omni-directional anemometer that can withstand harsh environments and abuse, measure air pressure from multiple measuring points, and determine the highest wind speed and its direction, and communicate that information to interested individuals.

SUMMARY OF THE DISCLOSURE

An omni-directional anemometer system for measuring and determining wind speed and directional measurement is provided. A first system may include a housing, the housing having a cavity, a plurality of ports disposed about the housing, the ports also disposed between the exterior of the housing and the cavity, in fluid communication with the atmosphere, and at least one sensor, disposed in the cavity, wherein at least one sensor may be in fluid communication with the plurality of ports, and wherein at least one sensor may be configured to measure air pressure and send air pressure measurement signals.

The first system may include a housing that may be further defined by a top portion, one or more side portions, and a bottom portion.

The first system may include an access panel for accessing the cavity and a mounting device for selectively securing the housing to a vehicle and/or structure.

The first system may include a housing that may be formed by one of additive manufacturing, casting, machining, or molding.

The first system may include a plurality of ports that may include at least one orifice in fluid communication with at least one sensor.

The first system may include a controller connected to at least one sensor and may include a processor and a memory, wherein the memory may include a set of instructions for processing the air pressure measurement signals provided by at least one sensor. The set of instructions may include determination of the highest wind speed and/or the direction of the highest wind speed relative to the plurality of ports.

The first system may include a communication module connected to at least one sensor and/or the controller and may be configured to send and/or receive the air pressure measurement signals from at least one sensor and/or the controller using wired and/or wireless communication. The communication module may send the air pressure measurement signals received from at least one sensor and/or controller to a network, a server, a vehicle, a structure, and/or a user interface, that may include a second processor, a second memory, and a second set of instructions to determine wind speed and direction. The communication module may be configured to communicate with a second system for measuring wind speed and direction.

The first system may include an interface display module connected to one of the sensors, the controller, and/or the communication module and may display the measured wind speed and direction.

The first system may include a power supply, wherein the power supply may include a battery and/or a connection to an external power source.

The first system may include a diagnostic system for detecting errors of the plurality of ports and/or at least one sensor, the diagnostic system including a maintenance mode configured to operate an air pump, at least one valve, and a piping system connecting the air pump and the at least one valve with the plurality of ports.

A second system for measuring wind speed and direction may include an enclosure for a plurality of sensors for measuring air pressure, a plurality of ports extending from the exterior to the interior of the enclosure, the ports connected to the plurality of sensors, and a power supply connected to the plurality of sensors.

The second system may include a controller connected to the plurality of sensors, the controller including a processor and a memory, and a set of instructions for processing air pressure measurement signals from the plurality of sensors.

The second system may include a communication module connected to the plurality of sensors and/or the controller.

The second system may include a diagnostic system for detecting errors with the plurality of sensors and/or for clearing the plurality of ports wherein the diagnostic system further includes an air pump, at least one valve, and a piping system connecting the air pump and the valve with the plurality of ports.

The third system may include a cylindrical enclosure, the cylindrical enclosure defined by a top portion, a side portion, and a bottom portion, a plurality of ports disposed about the side portion, in fluid communication with a plurality of sensors, the plurality of sensors disposed within the cylindrical enclosure, a controller disposed within the enclosure, the controller connected to the plurality of sensors and provided with a processor, a memory, and a set of instructions to process air pressure measurement signals to determine wind speed and direction.

The third system may include a communication module for sending the determined wind speed and direction from the controller to at least one of a network, a server, a vehicle, a structure, or a user interface. The network, the server, the vehicle, the structure, or the user interface may include a second processor, a second memory, and a second set of instructions to process air pressure measurement signals to determine wind speed and direction.

The third system may include a cylindrical enclosure formed by one of additive manufacturing, casting, machining, or molding.

The third system may include a diagnostic system for detecting errors with the plurality of sensors and/or for clearing the plurality of ports wherein the diagnostic system further includes an air pump, at least one valve, and a piping system connecting the air pump and the valve with the plurality of ports.

The system may include a plurality of ports that may include a plurality of orifices in fluid communication with the plurality of sensors.

BRIEF DESCRIPTION OF THE DRAWINGS

Other advantages will be readily appreciated, as the same becomes better understood by reference to the following detailed description when considered in connection with the accompanying drawings wherein.

DETAILED DESCRIPTION

Figure 1A:
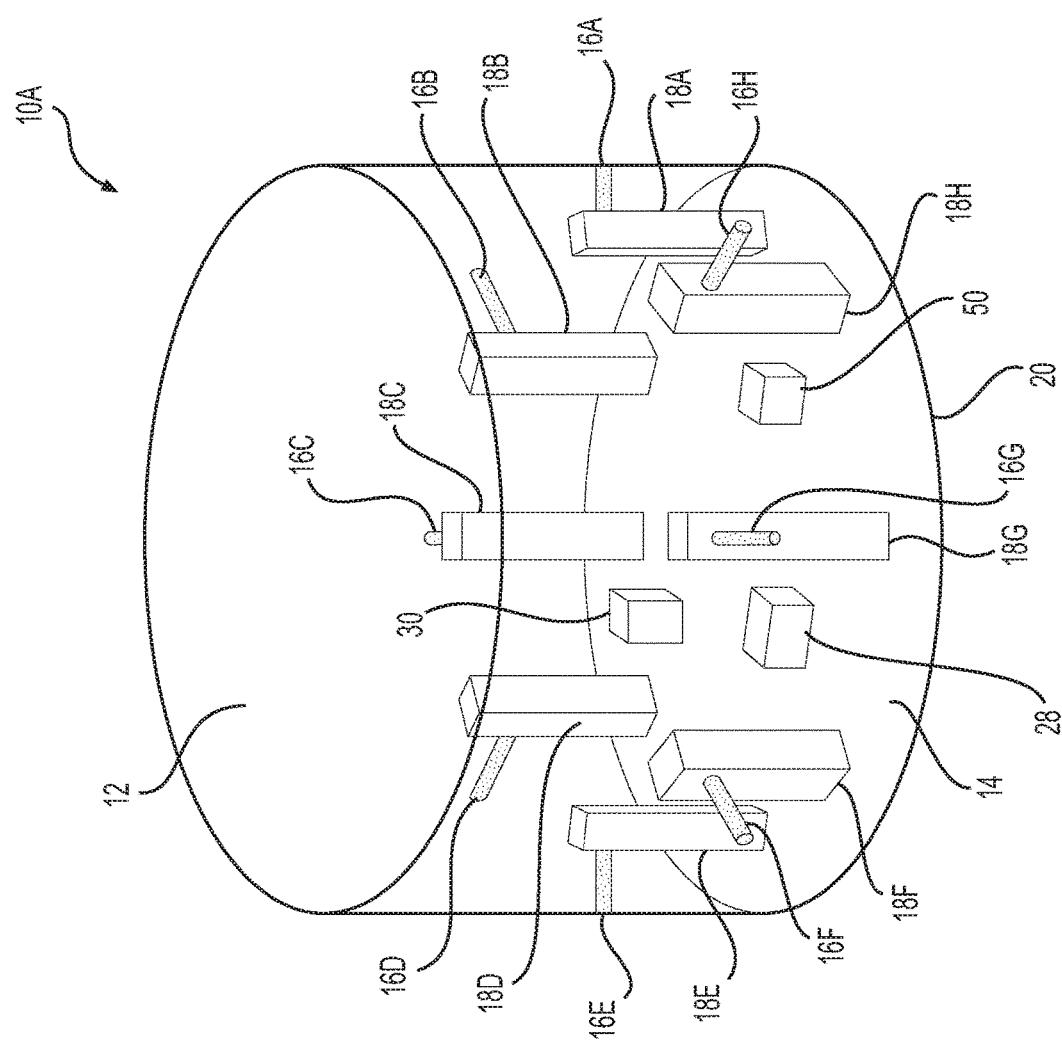
FIG. 1A is a cutaway view of a cylindrically-shaped system for measuring wind speed and direction.

Referring to the figures, wherein like numerals indicate corresponding parts throughout the several views, an anemometer system (hereinafter "anemometer") 10A, 10B for measuring wind speed and direction is provided. Anemometer 10A, 10B may be configured with a top portion 12, one or more side portions 14, one or more ports 16, one or more sensors 18, and a bottom portion 20.

As provided in FIGS. 1A-3, top portion 12, one or more side portions 14, and bottom portion 20 may be configured to enclose a volume, such as, but not limited to a cylinder, as shown in FIG. 1A. Side portion 14 of anemometer 10A, 10B may be configured to form a polygonal cylinder, for example, an octagonal (i.e., 8-sided), cylinder, or a sphere, as shown in FIG. 1B. It should be understood that anemometer 10A, 10B may be configured with only one side portion 14 (i.e., a one-sided, "smooth" cylinder), or with a plurality of side portions 14. It should be further understood that anemometer 10A, 10B may be configured in a number of shapes including one or more side portions 14 and the configurations shown in the figures are exemplary, and not limiting.

Anemometer 10A, 10B may be formed by machining, for example, a cylinder of a solid material (i.e., a blank), creating top portion 12, side portion 14, and bottom portion 20 from a material such as aluminum. Additional machining of the cylinder may form an access panel (not shown) and remove material from the cylinder forming an internal volume. Anemometer 10A, 10B may be formed using other fabrication processes, such as, but not limited to molding, forging, or additive manufacturing. Anemometer 10A, 10B may be formed of other materials suitable for the expected operational environment, such as, but not limited to, steel and other alloys, metals, polymers, and composites.

On one or more side portions 14 of anemometer 10A, 10B one or more ports 16 may be formed. Ports 16 may be configured at predetermined locations on side portions 14. For example and without limitation, ports 16 may be configured at equidistant points on a horizontal plane about the circumference of anemometer 10A, 10B. Ports 16 may be configured on a single plane relative to anemometer 10A, 10B. Ports 16 may be cylindrical, for example, and extend from the exterior of anemometer 10A, 10B on side portions 14 to the interior of anemometer 10A, 10B. Ports 16 may be configured with holes (i.e., orifices), at (or near) the opposite end of ports 16. The holes of ports 16 may be in fluid communication (i.e., exposed to the atmosphere), with one or more sensors 18. Ports 16 may include a drain (not shown) to allow water to exit and may include a heating element (not shown) to prevent icing. Ports 16 may include a vapor-permeable membrane (not shown) to prevent debris and other unwanted items from entering ports 16 (i.e., insects, dirt).

Anemometer 10A, 10B may include one or more sensors 18. Sensors 18 may be configured to measure wind speed and direction. Sensors 18 may be configured to measure wind speed and direction by measuring air pressure. Sensors 18 may be capacitive or potentiometric, for example. Sensors 18 may be configured adjacent to the holes of ports 16. For example, sensors 18 may be configured below the holes of ports 16, as shown in FIGS. 1A-2. Sensors 18 may be configured at the end of ports 16 within anemometer 10A, 10B. Sensors 18 may be in electronic communication with other components of anemometer 10A, 10B, such as, but not limited to, controller 28, communications module 30, and/or power supply 50. Sensors 18 may be in communication with a vehicle 24, networks 34A-34B, a server 36, and/or a user interface device 42.

Figure 5:
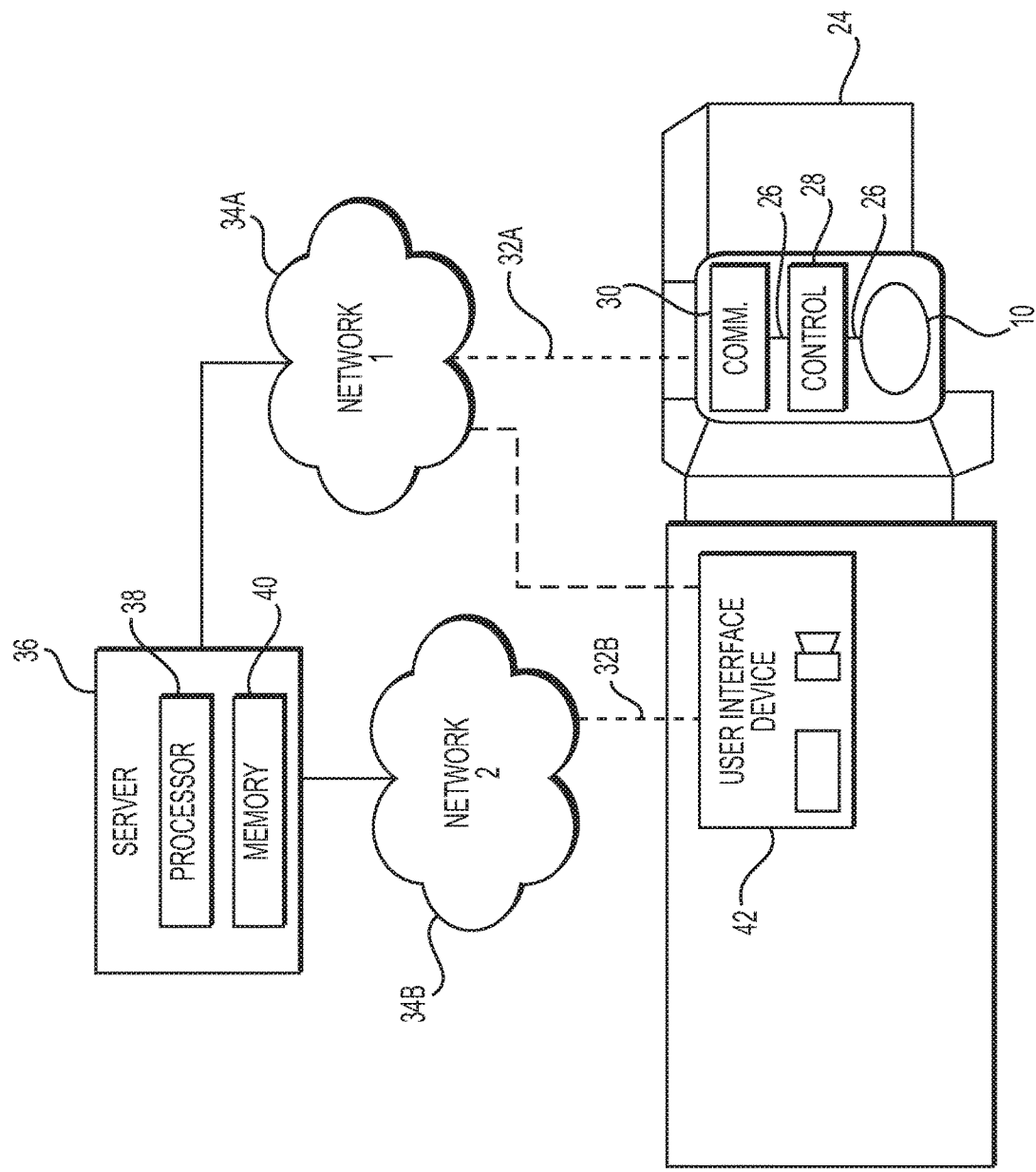
FIG. 5 is a block diagram of a system for measuring wind speed and direction including a vehicle with a controller, a communication module and a user interface, external networks, and an external server.

Sensors 18 may include some or all of the functions of controller 28, communications module 30, and/or power supply 50. For example, sensors 18 may be configured to be at least partially self-sufficient (i.e., have an internal power supply such as a battery), or may be configured to be part of the larger system of anemometer 10A, 10B (as shown in FIG. 5). Sensors 18 may be configured to be easily replaceable, with or without physical (i.e., wire), connections to controller 28, communications module 30, and/or power supply 50. Sensors 18 may be configured to send and/or receive data (i.e., electronic signals), to controller 28 and/or communications module 30 either automatically or by request from controller 28 and/or communications module 30. Sensors 18 may be configured to send and/or receive data apart from air pressure data, such as, but not limited to, date/time and calibration/firmware updates.

Figure 3:
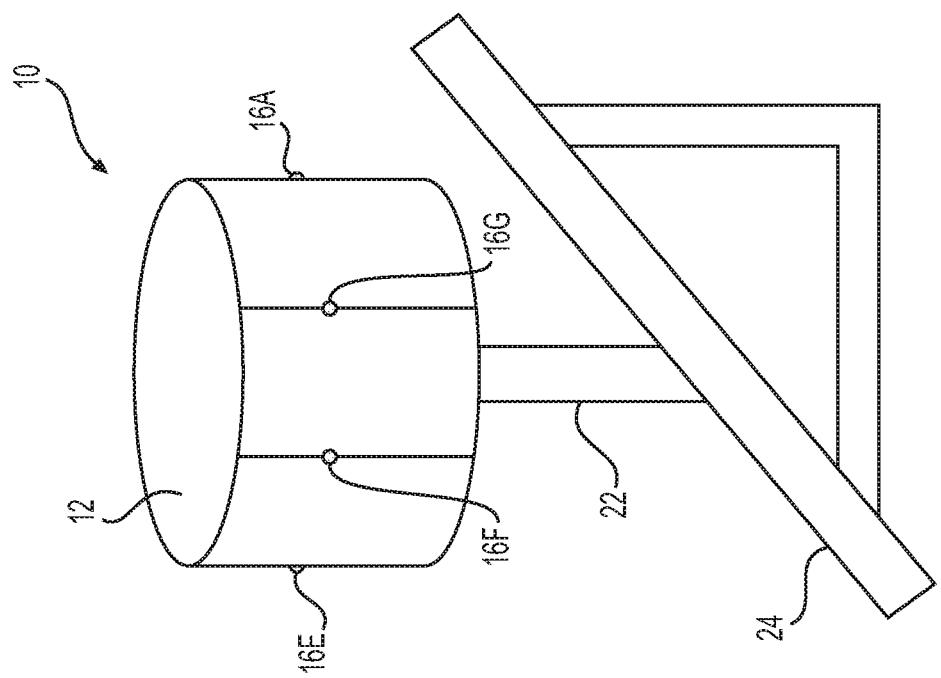
FIG. 3 is a side view of a system for measuring wind speed and direction mounted to a vehicle or structure.

Anemometer 10A, 10B may include a mount (i.e., device), 22 that may be configured on top portion 12, side portions 14, and/or bottom portion 20. Mount 22 may be configured to position anemometer 10A, 10B such that ports 16 (and sensors 18) are exposed to moving air (i.e., the atmosphere). Mount 22 may include connection devices (not shown) such that mount 22 may be secured to a vehicle or structure 24 (as shown in FIG. 3). It should be understood that the terms "vehicle" and "structure" are used interchangeably herein. Mount 22 may be configured to withstand a harsh environment typical of construction or other outdoor situations. For example, mount 22 may be configured to withstand debris falling on anemometer 10A, 10B without losing structural integrity and protecting anemometer 10A, 10B as well as internal components such as sensors 18. Mount 22 may be configured with robust high-strength materials, such as steel, that resist impact damage as well as damage from high-velocity winds that anemometer 10A, 10B may be exposed to. Mount 22 may be configured with adjustment capability such that mount 22 may be re-oriented, rotated, raised, lowered, or otherwise adjusted to place anemometer 10A, 10B in a desired (or favorable) wind measuring position. Mount 22 may be configured to be stowable (i.e., removable, collapsible), such that anemometer 10A, 10B and mount 22 may either be removable from vehicle 24 (such as for transport) or placed in a protected position (such as when not in use). Mount 22 may be configured to be detachable from vehicle 24. Mount 22 may include wired communication links 26 and/or wireless communications links 32 for anemometer 10A, 10B and/or vehicle 24. Mount 22 may include "quick-connect/disconnect" devices (not shown) such as magnets, pins, or bolts that allow for mount 22 to be quickly installed and/or removed from vehicle 24.

Figure 4:
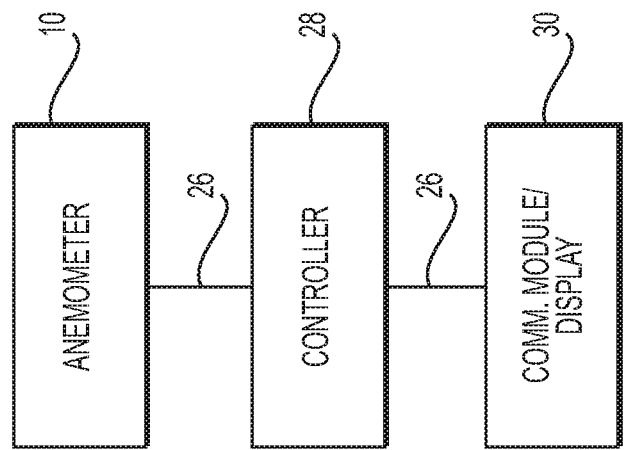
FIG. 4 is a block diagram of a system for measuring wind speed and direction.

As provided in FIGS. 2, 4-5, anemometer 10A, 10B may be configured with wired communications links 26. It should be understood that any or all instances of wired communications links 26 in the system of anemometer 10A, 10B may be replaced with wireless communications links 32, which will be discussed in more detail below. Within anemometer 10A, 10B, wired communication links 26 may be configured between sensors 18, controller 28, and/or communications module 30. Wired communication links 26 may be configured between anemometer 10A, 10B (such as bottom 20) and mount 22. Wired communication links 26 may be configured between anemometer 10A, 10B and vehicle 24. Wired communication links 26 may provide for electronic communication between sensors 18, controller 28, and/or communications module 30 of anemometer 10A, 10B. Electronic communication may include analog, digital, and/or optical signals, for example. Electrical power may be transmitted via wired communication links 26, such as from power supply 50 to sensor 18, communication module 20, and/or controller 28.

Controller 28 may be configured within anemometer 10A, 10B. Controller 28 may be connected to one or more sensors 18 by wired communication links 26 (as stated above, wireless communications links 32 may also be used). Controller 28 may be connected to communications module 30 and/or power supply 50. Controller 28 may include a first processor 38 and a first memory 40, and instructions stored therein. Controller 28 may be configured to operate sensors 18 based on the instructions and/or by communications sent and/or received by communications module 30. Controller 28 may be configured to send and/or receive data (i.e., information, commands), via communications module 30. Controller 28 may be configured with a set of instructions to process signals from sensors 18 to determine wind speed and direction, which will be described in detail below.

As shown in FIGS. 2, 4-5, anemometer 10A, 10B may include a communications module 30. Communications module 30 may be configured within anemometer 10A, 10B, as shown in FIG. 2. Alternatively, communications module 30 may be configured externally to anemometer 10A, 10B, as shown in FIGS. 4-5. Communications module 30 may be configured to send and/or receive data from anemometer 10A, 10B, sensors 18, and/or controller 28 via wired communications link 26 (or wireless communication links 32). Communications module 30 may be configured with a display and/or user interface device 42 to send and receive information to a user. Communications module 30 may be configured to use different types of communication signals to send and receive information, such as Wi-Fi, cellular telephone (i.e., 4G, 5G, etc.), and radio frequencies, or a combination thereof. Communications module 30 may be configured with the capability to send and/or receive more than one type of communication signals, depending upon the availability, performance, and/or cost of using the communication signals.

Referring now to FIG. 5, anemometer 10A, 10B is provided mounted to vehicle 24. Vehicle 24 may be, for example, a mobile crane or mobile lift platform, or another type of vehicle (or structure) 24 that may be affected by high winds. However, structure 24 may instead be a bridge, and one or more anemometers 10A, 10B may be mounted on elevated portions of the bridge structure, to measure air pressure at those elevated portions, for example. The measured air pressure may then be used to determine (via calculations as described below) if the crane is safe to operate, or if the bridge is safe to cross, or for workers to perform maintenance on the bridge. As provided in FIGS. 1-2, anemometer 10A, 10B may be configured with ports 16 and sensors 18 for measuring air pressure. Anemometer 10A, 10B may include mount 22 (as shown in FIG. 3) to secure anemometer 10A, 10B to vehicle 24. Alternatively, anemometer 10A, 10B may be secured directly to vehicle 24, such as on the roof of vehicle 24 (as shown in FIG. 5). Vehicle 24 may include controller 28 and/or communications module 30 connected by wired communication links 26 (or wireless communication links 32) to anemometer 10A, 10B.

Communications module 30 may be configured to a network 34A via wireless connection links 32. Network 34A may use communication signals as described above (e.g., Wi-Fi, 4G, 5G). Network 34A may be configured to communicate with server 36 that may be at a remote location, such as a management office or a control room. Server 36 may include a second processor 38 and a second memory 40, and a set of instructions stored thereon to process air pressure measurement data generated by sensors 18 and determine wind speed and direction. Server 36 may be configured to operate sensors 18 based on the instructions and/or by communications sent and/or received by communications module 30. Server 36 may be configured to send and/or receive data (i.e., information, commands), via communications module 30. Server 36 may be configured with a set of instructions to process wind speed and measurement data, which will be described in detail below.

Server 36 may be configured to communicate with network 34A or network 34B to a user interface device 42. User interface device 42 may be configured on vehicle (or structure) 24, as a remote separate device (i.e., a handheld mobile electronic device), as an application (i.e., software), on an existing remote separate device (i.e., a smart phone, tablet, or computer), and/or as an indicator (e.g., light, sound) on an existing component of vehicle 24 (i.e., the instrument panel). User interface device 42 may be configured on all or some of the above-described devices and/or locations. For example, user interface device 42 may be present at the management office, on vehicle 24, on a smart phone of the operator of vehicle 24, and on the instrument panel of vehicle 24. User interface device 42 may be configured with visual and/or audio inputs and/or outputs. For example, user interface device 42 may receive configuration data such as a desired maximum wind speed warning (e.g., 45 km/hr). Upon a determination by anemometer 10A, 10B and/or server 36 that the desired maximum wind speed has been reached, user interface device 42 may display a warning light, emit a sound, and/or other outputs (e.g., vibrate smart phone, send text message, telephone call with message). User interface device 42 may be configured to interact with other systems of vehicle or structure 24. For example, user interface device 42 may display when anemometer 10A, 10B is stowed or inactive (such as for transport). User interface device 42 may be configured with other safety systems, such as a high-wind warning system that may be used on structure 24 (e.g., off-shore oil platform, helipad, bridge).

Figure 6:
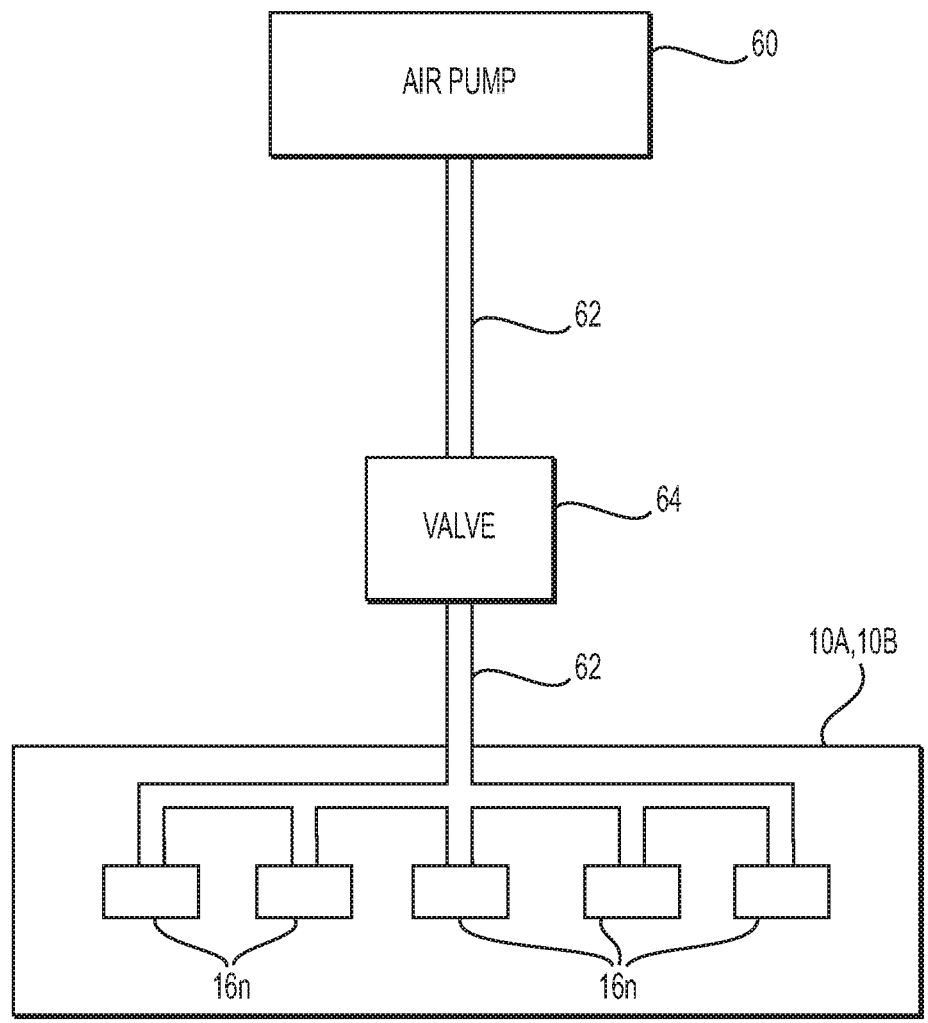
FIG. 6 is a block diagram of the maintenance mode of a diagnostic system for clearing ports included in a system for measuring wind speed and direction.

As provided in FIG. 6, anemometer 10A, 10B may include a diagnostic system. The diagnostic system may be included (e.g., as a set of instructions), within one or more sensors 18, controller 28, and/or communications module 30. Additionally and alternatively, the diagnostic system may be included in networks 34A, 34B, and/or server 36. The diagnostic system may be configured to detect faults within system of anemometer 10A, 10B. For example and without limitation, the diagnostic system may be configured to detect one or more plugged (i.e., blocked, obstructed, partially obstructed), ports 16 and/or defective (i.e., inoperative, out of calibration), sensors 18. The diagnostic system may be configured to determine faults by analyzing the high frequency content of sensors 18. The diagnostic system may be configured to analyze the high frequency content of sensors 18 by measuring/monitoring resonance based at least in part on the length and/or volume of ports 16. If the diagnostic system determines through analysis that some amount of the resonance may be missing (i.e., a departure from predetermined levels), while simultaneously analyzing that the resonance from other sensors 18 may be at a predetermined level, the diagnostic system may determine that the port(s) 16 and their corresponding sensor(s) 18 that have less than the predetermined level of resonance may be defective and/or may have a fault (i.e., port 16 may be plugged or partially plugged, sensor 18 may be defective).

Additionally and alternatively, the diagnostic system of anemometers 10A, 10B may be configured to determine that an individual sensor 18 may be slow to respond to commands and/or may be providing signals that may differ (e.g., a higher or lower voltage), from the signals from other sensors 18. The diagnostic system may be configured to determine that the individual sensor 18 with the slow response and/or abnormal signal may be defective (i.e., have a fault), and/or otherwise be considered unreliable. The diagnostic system may be configured to provide this information via components of the system of anemometers 10A, 10B as described above. The diagnostic system may also be configured to execute a maintenance mode, described in detail below.

Anemometers 10A, 10B may include an air pump 60, a piping system 62, and at least one valve 64. The diagnostic system may include a maintenance mode (e.g., as a set of instructions), configured to operate air pump 60, piping system 62, and valve 64. Air pump 60 may be configured to provide pressurized air via piping system 62 to valve 64. Valve 64 may be configured as a check (i.e., one-way), valve 64 such that pressurized air may travel from air pump 60 through piping system 62 to one or more ports 16 of anemometers 10A, 10B, but pressurized air (as well as debris) may be prevented from passing from ports 16 through valve 64 to air pump 60. When the diagnostic system determines, through analysis as described above, that one or more ports 16 may be clogged/plugged, the diagnostic system may execute the maintenance mode. Execution of the maintenance mode may result in the activation of air pump 60 to pressurize air. It should be understood that air pump 60 may be configured with a storage device (i.e., tank, accumulator), to pressurize air in piping system 62. Additionally and alternatively, air pump 60 may be configured with an integrated compressor (e.g., scroll-type), to pressurize air sufficiently to open valve 64. The pressurized air may move past valve 64 via piping system 62 into anemometers 10A, 10B and into one or more ports 16n. The pressurized air may travel through one or more ports 16n, forcibly discharging any debris (e.g., dirt, insects, water, ice), that may be present in or around one or more ports 16n. Maintenance mode may be configured to execute on a regular basis, such as daily or weekly, apart from execution on a determination by the diagnostic system that one or more faults have been detected.

The calculations and methods used to determine the maximum wind speed and direction are described below. Controller 28 activates sensors 18 within anemometer 10A, 10B. Sensors 18 simultaneously (or nearly simultaneously) measure the air pressure within their respective ports 16. Controller 28 may send this data via communications module 30 to server 36 for further processing and/or controller 28 may perform further processing on the data received from sensors 18. For either situation, the next step in processing the data is determining which of sensors 18 measured the highest air pressure. Once that determination has been made, the next step is to determine air pressures measured at the two ports 16 that are 45 degrees offset (i.e., on either side of port 16), from the port 16 with the highest air pressure. The next step is to determine the air pressures measured at the two ports 16 that are 90 degrees offset from the port 16 with the highest air pressure.

Once the highest measure air pressure, the two air pressures 45 degrees offset, and the two air pressures 90 degrees offset have been determined, an average of the 45 degree offset air pressures and the 90 degree offset air pressures may be determined. As a result of these calculations, performed within anemometer 10A, 10B by controller 28 and/or by server 36, three values are determined—highest air pressure, average of 45 degree offset air pressure, and average of 90 degree offset air pressure. By solving a system of three equations using the formula shown below, the maximum wind speed and direction can be determined:

$$P_\Theta = P_\infty + 1/2\rho U_\infty^2(1 - 4\sin^2\Theta)$$

where $P_\Theta$ is the highest air pressure (0 degrees), the average of 45 degree offset air pressure, and the average of 90 degree offset air pressure in three equations;

where $P_\infty$ is the air pressure far away from the anemometer (i.e., atmospheric);

where $\rho$ is the density of air; and where $\Theta$ is 0 degrees, 45 degrees, and 90 degrees (in three simultaneous equations); and solving the three simultaneous equations for $U_{0\ degrees}$, $U_{45\ degrees}$, and $U_{90\ degrees}$, respectively.

Controller 28 of anemometer 10A, 10B and/or server 36 may solve the three simultaneous equations described above by analytic methods, numerical methods, and/or by look-up tables. The use of sampling rates and/or digital filtering by controller 28 and/or server 36 may be used to create a non-aliased and responsive wind speed and direction measurement. In the situation where peak (i.e., highest), air pressure measurements on two ports 16 are nearly equal and higher than the remaining ports 16 air pressure measurements, the above equations can be modified and solved by controller 28 and/or server 36 by replacing $U_{0\ degrees}$ with $U_{22.5\ degrees}$, $U_{45\ degrees}$ with $U_{67.5\ degrees}$, and $U_{90\ degrees}$ with $U_{112.5\ degrees}$, respectively.

The calculations performed by anemometer 10A (as shown in FIG. 1A) may be configured to provide a two-dimensional ("2D") wind speed and direction measurement. For example, ports 16A-16H may be configured on a horizontal plane on side 14 of anemometer 10A, and the 2D wind speed and direction measurement may be determined relative to the horizon (i.e., a 2D horizontal velocity vector). Additionally and alternatively, ports 16A-16H may be configured on a vertical plane, and the 2D wind speed and direction measurement may be determined relative to the vertical. These configurations, or combinations of both may provide a suitable wind speed and direction measurement (e.g., a vector), for a number of situations, such as those where the prevailing winds typically travel in one plane.

Figure 1B:
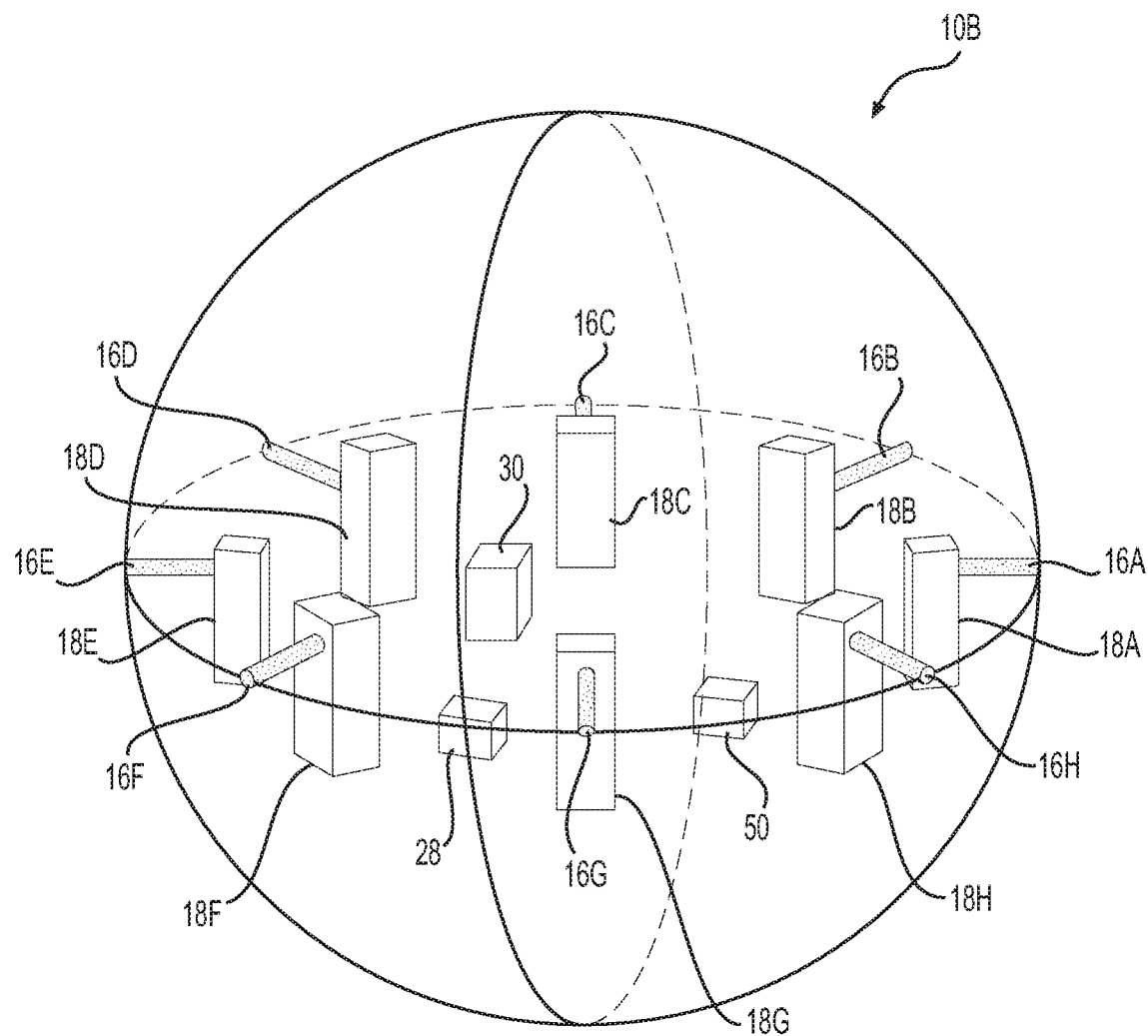
FIG. 1B is a cutaway view of a spherically-shaped system for measuring wind speed and direction.
Figure 2:
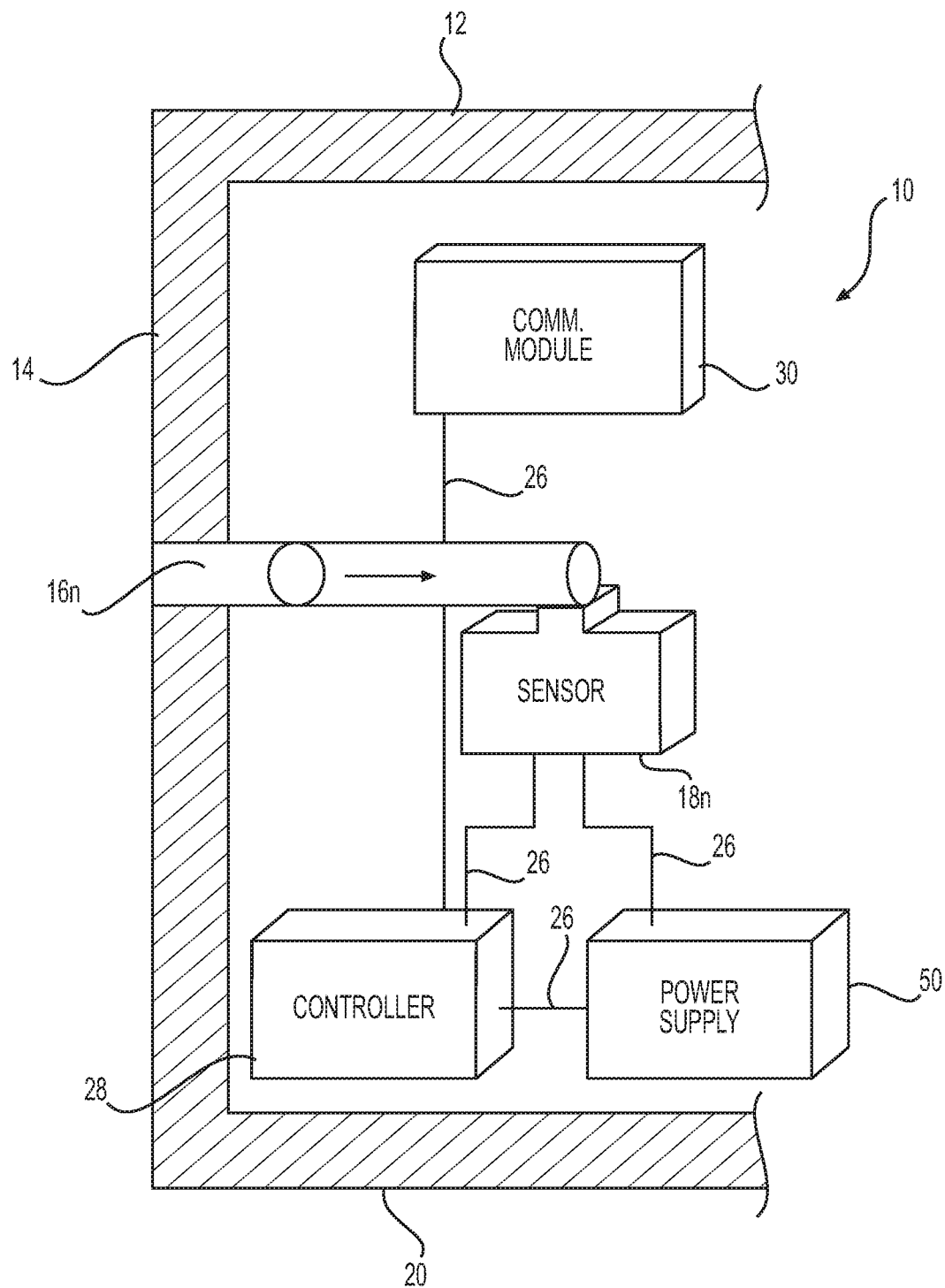
FIG. 2 is a partial section view of a system for measuring wind speed and direction.

For other situations, such as where the prevailing winds are more unpredictable (e.g., at the top of a tall building), the calculations performed by anemometer 10B (as shown in FIG. 1B) may be configured to provide a three-dimensional ("3D") wind speed and direction measurement. For example, ports 16A-16H may be configured equidistantly (i.e., the same distance), from each other on the sphere of anemometer 10B, and the 3D wind speed and direction measurement may be determined in a 3D velocity vector.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

Obviously, many modifications and variations of the present system are possible in light of the above teachings and may be practiced otherwise than as specifically described while within the scope of the appended claims.

What is claimed is:

1. A system for measuring wind speed and direction comprising:
   a housing, wherein the housing defines a cavity;
   a plurality of ports disposed about the housing, the ports disposed between the exterior of the housing and the cavity, and disposed in fluid communication with the atmosphere;
   at least one sensor, disposed in the cavity, wherein the at least one sensor is in fluid communication with the plurality of ports, and wherein the at least one sensor is configured to measure air pressure and send air pressure measurement signals; and
   a diagnostic system for detecting errors of the plurality of ports and/or at least one sensor, the diagnostic system including a maintenance mode configured to operate an air pump, at least one valve, and a piping system connecting the air pump and the at least one valve with the plurality of ports.

2. The system for measuring wind speed and direction as set forth in claim 1, wherein the housing is further defined by a top portion, one or more side portions, and a bottom portion.

3. The system for measuring wind speed and direction as set forth in claim 2, further comprising:

an access panel for accessing the cavity; and
a mounting device for selectively securing the housing to a vehicle and/or structure.

4. The system for measuring wind speed and direction as set forth in claim 1, wherein the housing is formed by one of additive manufacturing, casting, machining, or molding.

5. The system for measuring wind speed and direction as set forth in claim 1, wherein each of the plurality of ports include at least one orifice in fluid communication with the at least one sensor.

6. The system for measuring wind speed and direction as set forth in claim 1, further comprising a controller connected to the at least one sensor and includes a processor and a memory, wherein the memory includes a set of instructions for processing air pressure measurement signals provided by the at least one sensor.

7. The system for measuring wind speed and direction as set forth in claim 6, wherein the instructions include determining the highest wind speed and/or the direction of the highest wind speed relative to the plurality of ports.

8. The system for measuring wind speed and direction as set forth in claim 6, further comprising a communication module connected to the at least one sensor and/or the controller and configured to send and/or receive the air pressure measurement signals from the at least one sensor and/or the controller using wired and/or wireless communication.

9. The system for measuring wind speed and direction as set forth in claim 8, wherein the communication module for sends air pressure measurement signals received from the at least one sensor and/or controller to a network, a server, a vehicle, a structure, and/or a user interface wherein at least one further includes a second processor, a second memory, and a second set of instructions to determine wind speed and direction.

10. The system for measuring wind speed and direction as set forth in claim 8, wherein the communication module is configured to communicate with at least a second system for measuring wind speed and direction.

11. The system for measuring wind speed and direction as set forth in claim 6, further comprising an interface display module connected to the at least one sensor, the controller, and/or the communication module and displays the measured wind speed and direction.

12. The system for measuring wind speed and direction as set forth in claim 1, further comprising a power supply, wherein the power supply includes a battery and/or a connection to an external power source.

13. A system for measuring wind speed and direction comprising:
an enclosure for a plurality of sensors for measuring air pressure;
a plurality of ports extending from the exterior to the interior of the enclosure, the ports connected to the plurality of sensors;
a power supply connected to the plurality of sensors; and
a diagnostic system for detecting errors of the plurality of ports and/or the plurality of sensors, the diagnostic system including a maintenance mode configured to operate an air pump, at least one valve, and a piping system connecting the air pump and the at least one valve with the plurality of ports.

14. The system for measuring wind speed and direction as set forth in claim 13, further comprising a controller connected to the plurality of sensors, the controller including a processor and a memory, and a set of instructions for processing air pressure measurement signals from the plurality of sensors.

15. The system for measuring wind speed and direction as set forth in claim 14, further comprising a communication module connected to the plurality of sensors and/or the controller.

16. A system for measuring wind speed and direction comprising:
a cylindrical enclosure, the cylindrical enclosure defined by a top portion, a side portion, and a bottom portion;
a plurality of ports disposed about the side portion, in fluid communication with a plurality of sensors, the plurality of sensors disposed within the cylindrical enclosure;
a controller disposed within the enclosure, the controller connected to the plurality of sensors and provided with a processor, a memory, and a set of instructions to process air pressure measurement signals to determine wind speed and direction; and
a diagnostic system for detecting errors with the at least one sensor and/or for clearing the plurality of ports wherein the diagnostic system further comprises an air pump, at least one valve, and a piping system connecting the air pump and the at least one valve with the plurality of ports.

17. The system for measuring wind speed and direction as set forth in claim 16, further comprising a communication module for sending the determined wind speed and direction from the controller to at least one of a network, a server, a vehicle, a structure, or a user interface.

18. The system for measuring wind speed and direction as set forth in claim 17, wherein the at least one of the network, the server, the vehicle, the structure, or the user interface includes a second processor, a second memory, and a second set of instructions to process air pressure measurement signals to determine wind speed and direction.

19. The system for measuring wind speed and direction as set forth in claim 16, wherein the cylindrical enclosure is formed by one of additive manufacturing, casting, machining, or molding.

20. The system for measuring wind speed and direction as set forth in claim 16, wherein the plurality of ports includes a plurality of orifices in fluid communication with the plurality of sensors.

21. The system for measuring wind speed and direction as set forth in claim 16, wherein the diagnostic system including a maintenance mode configured to operate an air pump, at least one valve, and a piping system connecting the air pump and the at least one valve with the plurality of ports.

* * * * *